(12) United States Patent
Seok et al.

(10) Patent No.: US 7,450,193 B2
(45) Date of Patent: Nov. 11, 2008

(54) LCOS PANEL ASSEMBLY OF PROJECTION SYSTEM AND IMAGE MATCHING METHOD HAVING QUARTER WAVE PLATE HOLDER ROTATABLY SUPPORTED ABOUT PANEL SUPPORT BY RESPECTIVELY SLOTS AND PROTRUSIONS

(75) Inventors: Ju Wan Seok, Sunchun-shi (KR); Sung ok Cheun, Daegu-si (KR); Moung Youb Lee, Busan-si (KR)

(73) Assignee: LG Electronics Inc., Seoul (KR)

( * ) Notice: Subject to any disclaimer, the term of this patent is extended or adjusted under 35 U.S.C. 154(b) by 365 days.

(21) Appl. No.: 11/302,462

(22) Filed: Dec. 14, 2005

(65) Prior Publication Data

US 2007/0047112 A1 Mar. 1, 2007

(30) Foreign Application Priority Data

| Aug. 5, 2005 | (KR) | ...................... 10-2005-0071767 |
| Aug. 5, 2005 | (KR) | ...................... 10-2005-0071768 |
| Aug. 5, 2005 | (KR) | ...................... 10-2005-0071770 |

(51) Int. Cl.
*G02F 1/1333* (2006.01)

(52) U.S. Cl. ............................................. 349/58; 349/5
(58) Field of Classification Search ............. 349/58–60, 349/5–10
See application file for complete search history.

(56) References Cited

U.S. PATENT DOCUMENTS

| 6,844,979 B2 * | 1/2005 | Maki et al. ................... 359/629 |
| 2006/0077314 A1 * | 4/2006 | Li et al. ......................... 349/58 |

\* cited by examiner

*Primary Examiner*—David C. Nelms
*Assistant Examiner*—John Heyman
(74) *Attorney, Agent, or Firm*—Ked & Associates, LLP

(57) ABSTRACT

There is provided a LCOS panel assembly of a projection system comprising: a LCOS panel; a panel support supporting the LCOS panel and coupled to the quad side; a quarter-wave plate provided at the front side of the LCOS panel to polarize light; a quarter-wave plate holder rotatably supported about the panel support at a state where the quarter-wave plate is coupled thereto; and adhesives interposed on a contact surface of the quarter-wave plate holder and the panel support, so that foreign substance is prevented from being injected on a optical path of the LCOS panel assembly of the projection system or image matching is prevented from being deteriorated.

19 Claims, 7 Drawing Sheets

LCOS PANEL ASSEMBLY OF PROJECTION SYSTEM AND IMAGE MATCHING METHOD HAVING QUARTER WAVE PLATE HOLDER ROTATABLY SUPPORTED ABOUT PANEL SUPPORT BY RESPECTIVELY SLOTS AND PROTRUSIONS

This Nonprovisional application claims priority under 35 U.S.C. § 119(a) on Patent Application No. 10-2005-0071767, 10-2005-0071768, 10-2005-0071770, filed in Korea on 5 Aug. 2005 the entire contents of which are hereby incorporated by reference.

BACKGROUND OF THE INVENTION

1. Field of the Invention

The present invention relates to a projection system, and more particularly, to a LCOS panel assembly of a projection system that can provide a high definition screen for long time by a LCOS panel assembly in a reflecting-type projection system in which an image is formed by a LCOS Panel.

Still more particularly, it relates to a LCOS panel assembly of a projection system and an image matching method of the LCOS panel assembly which can provide a high definition screen even though the projection system is continuously used for long time, as foreign substance is prevented from being injected into the inside of the LCOS panel assembly and after a lot of parts constituting the LCOS panel assembly are coupled to each other, deformation due to residual stress between coupled portions is prevented, and image matching between parts provided at the inside of the LCOS panel assembly is reliably performed to prevent deformation between parts when using a product.

2. Description of the Background Art

Unlike a general liquid crystal display, a liquid crystal on silicon (hereinafter, referred to as "LCOS") that is a kind of a reflecting-type liquid crystal display forms a liquid crystal cell on a semiconductor substrate and can realize a high definition of a XGA grade or more in a small size of about one inch by arranging switching circuits and elements of each pixel in high integration.

For these reasons, the LCOS panel has been attracted as a display device of the projection system and technical development and commercialization of the LCOS panel and a projection display system using the LCOS panel have been actively progressed.

In order to embody a full color screen, the LCOS projection system uses a three panel type which converts white color light to RGB three color light, has three LCOS panels corresponding to the R, G, B light to compose R, G, B images embodied by each LCOS panel in a color image, and projects the composed image to a screen.

Such general LCOS projection system includes an illumination unit for projecting light, a composition unit for composing RGB three images displayed in the LCOS panel in an image after projecting light, a projecting lens for projecting light composed in the composition unit, and a screen for displaying light projected from the projecting lens to an image.

Specifically, three LCOS panels are additionally fixed to the composition unit, after each of RGB three color light separated from white color light is incident to the LCOS panel, it is reflected and the reflected light is composed. A quarter-wave plate is provided in a neighboring position of the LCOS panel to improve a contrast of an image. The quarter-wave plate performs an operation converting linear polarized light to circular polarized light.

On the other hand, because a contrast of an image is deteriorated and a color of an image is inaccurately expressed when matching of the quarter-wave plate and the LCOS panel is not perfectly performed, it is general to perform again matching of the quarter-wave plate and the LCOS panel while actually watching an image after the projection system is manufactured.

However, when manufacturing of the projection system is completed, it is not easy to control the quarter-wave plate.

Further, when the quarter-wave plate is manufactured in a movable type, foreign substance may be injected into a space between the quarter-wave plate and the LCOS panel. If foreign substance is attached on the quarter-wave plate, light transmitting a place where foreign substance is attached is intercepted, whereby a desirable image is not formed. For example, if foreign substance is attached on a red color LCOS panel, red color light is not reflected in the LCOS panel, whereby a pixel to be displayed in white color is displayed in cyan color that is the sum of green color and blue color with red color subtracted. Because foreign substance may be injected into other parts in addition to the quarter-wave plate and the LCOS panel at the inside of the LCOS panel, it is an important in the LCOS panel assembly to provide a perfect sealing structure so that foreign substance can not be injected into a space between all parts constituting the LCOS panel.

Further, as described above, because the LCOS panel assembly is manufactured by coupling of a lot of parts, a lot of coupled portions are generated, and because residual stress remaining in the coupled parts causes continuous deformation even after manufacturing of the projection system is completed, there is a problem that matching is not made. If image matching is not made in the LCOS panel assembly, it is difficult to embody a desired pixel, whereby deterioration of an image is generated.

SUMMARY OF THE INVENTION

Accordingly, an object of the present invention is to solve at least the problems and disadvantages of the background art.

An object of the present invention is to provide a LCOS panel assembly of a projection system and an image matching method of the LCOS panel which can easily perform matching of a LCOS panel and a quarter-wave plate.

Another object of the present invention is to provide a LCOS panel assembly of a projection system and an image matching method of the LCOS panel which can further improve image quality by originally preventing foreign substance from being injected into the inside of the LCOS panel assembly.

Still another object of the present invention is to provide a LCOS panel assembly of a projection system and an image matching method of the LCOS panel which can adjust matching of the LCOS panel and the quarter-wave plate even after adjustment of image matching between three LCOS panels is completed.

A further object of the present invention is to provide a LCOS panel assembly of a projection system and an image matching method of the LCOS panel which can prevent deterioration of an image due to using for long time because deformation of parts is prevented by residual stress generating in each parts constituting the LCOS panel assembly.

To achieve these and other advantages and in accordance with the purpose of the present invention, as embodied and broadly described, there is provided a LCOS panel assembly of a projection system comprising: a LCOS panel; a panel support supporting the LCOS panel and coupled to the quad side; a quarter-wave plate provided at the front side of the LCOS panel to polarize light; a quarter-wave plate holder rotatably supported about the panel support at a state where the quarter-wave plate is coupled thereto; and adhesives interposed to a contact surface of the quarter-wave plate holder and the panel support.

According to another aspect of the present invention, there is provide a LCOS panel assembly of a projection system comprising: a LCOS panel; a panel support supporting the LCOS panel and coupled to the quad side; a quarter-wave plate provided at the front side of the LCOS panel to polarize light; a quarter-wave plate holder coupled to the panel support at a state where the quarter-wave plate is coupled thereto; and a sealer interposed to a contact portion of the LCOS panel and the panel support.

According to a further aspect of the present invention, there is provided a LCOS panel assembly of a projection system comprising: a LCOS panel; a panel support supporting the LCOS panel at the front side and coupled to the quad side; a quarter-wave plate holder provided at the front side of the panel support to support a quarter-wave plate; and a sealer provided at the front side of the quarter-wave plate holder to seal a contact portion of the quarter-wave plate holder and the quad side.

According to a even further aspect of the present invention, there is provided a image matching method of a LCOS panel assembly, the method comprising the steps of: manufacturing a single LCOS panel assembly which rotatably supports a quarter-wave plate holder supporting a quarter-wave plate about a panel support supporting the LCOS panel; performing image matching between a plurality of LCOS panel assemblies; and curing adhesives to adhere and fix the quarter-wave plate holder and the LCOS panel assembly after image matching is performed between the quarter-wave plate and the LCOS panel.

As described above, according to the present invention, there is an advantage in that optimization of image matching of the projection system and a contrast ratio can be conveniently performed. Further, because foreign substance is prevented from being injected into the LCOS panel assembly, deterioration of an image is prevented. Further, because non-matching of parts constituting the LCOS panel assembly is prevented, high definition image can be embodied although the projection system is used for long time.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Hereinafter, a projection system and an LCOS panel assembly thereof according to the present invention will be described in detail with reference to the attached drawings.

Figure 1:
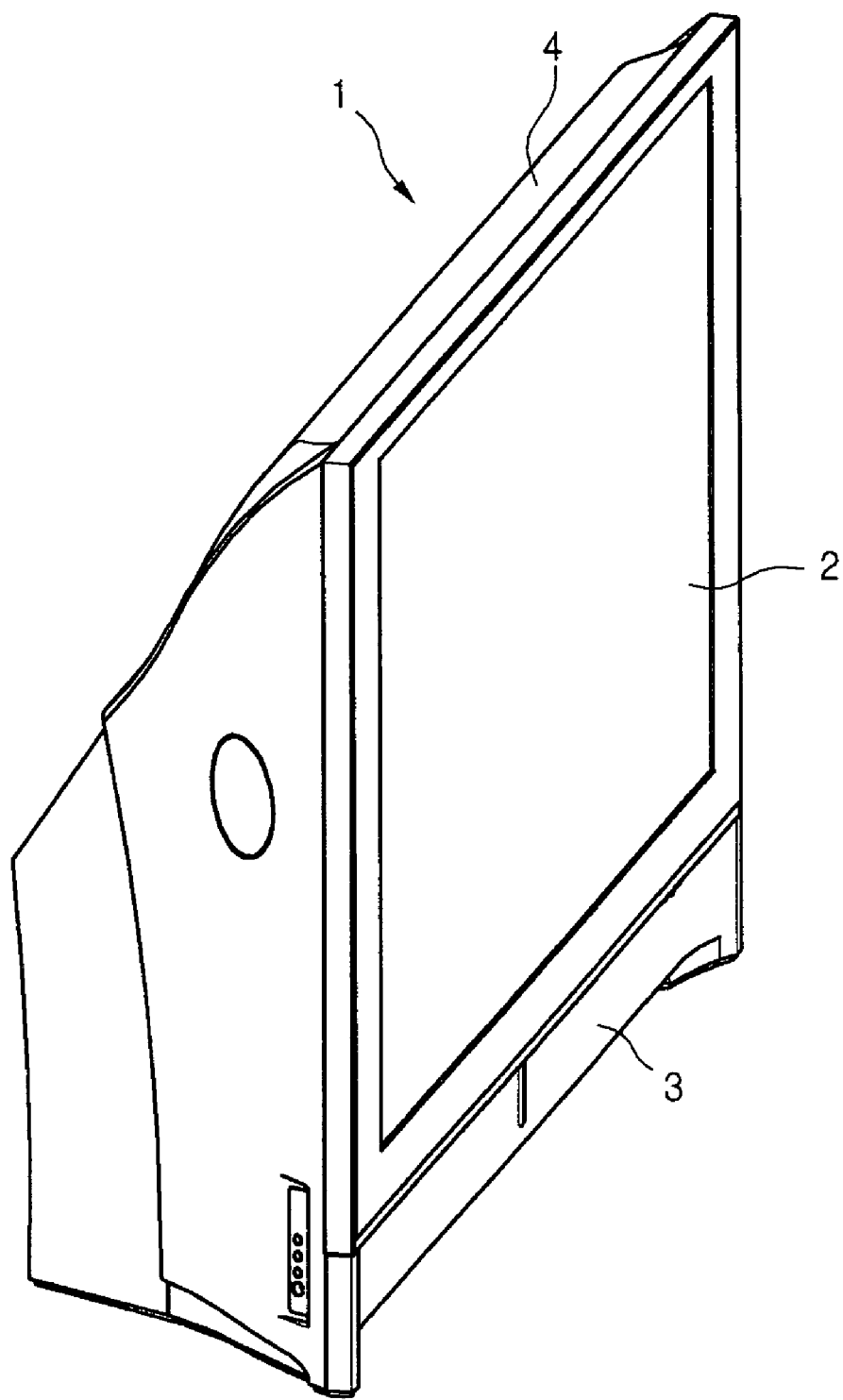
FIG. 1 is a perspective view of a projection system according to the present invention.
Figure 2:
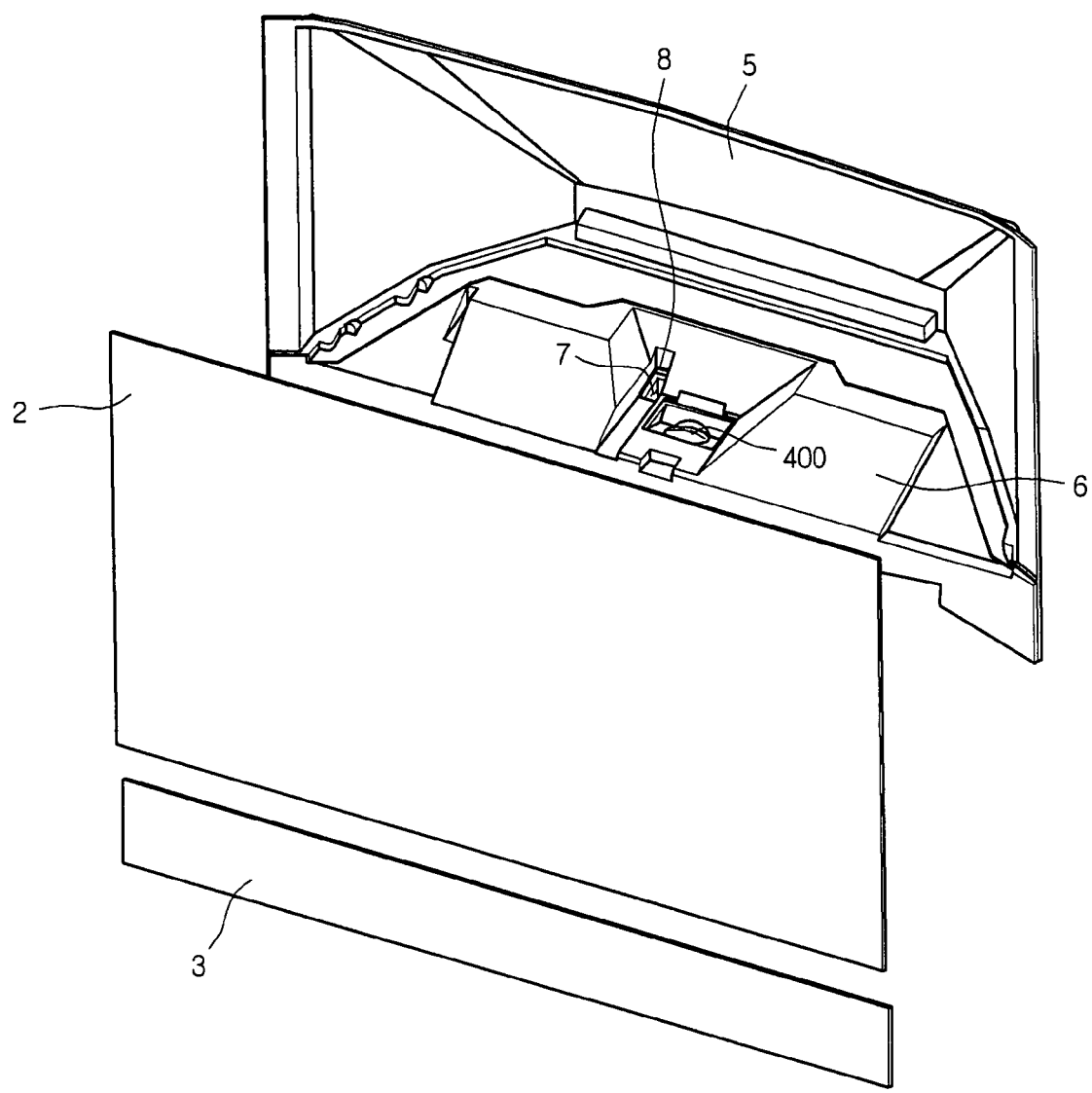
FIG. 2 is an exploded perspective view of a display in a projection system according to the present invention.

FIG. 1 is a perspective view of a projection system according to the present invention and FIG. 2 is an exploded perspective view of a display in the projection system according to the present invention.

Referring to FIGS. 1 and 2, a projection system 1 according to the present invention includes a screen 2 for displaying an image, a front panel 3 disposed at the lower side of the screen 2, and a back cover 4 disposed at the back side of the screen 2.

Further, a division plate 6 for dividing a light projecting space and an optical engine (see reference numeral 10 of FIG. 3) housing space is provided in a space between the screen 2 and the back cover 4. A reflecting mirror 5 is provided at the inside of the back cover 4 to reflect light which is projected from the optical engine 10 to the screen 2 and thus the reflected light is displayed to the screen 2 as an image.

Further, a opening portion 8 of the division plate side which communicates the light projecting space and the optical engine housing space is formed in the division plate 6 and the opening portion 8 is aligned with an air injection port 7 that is an air injection passage of the optical engine 10 side to inject inner air of the light projecting space into the optical engine 10. Air injected through the air injection port 7 is used as air for cooling the optical engine 10.

Reference numeral 400 shown in FIG. 2 indicates a projecting lens for emitting light from the optical engine 10 and light emitted from the projecting lens 400 is emitted to the reflecting mirror 5, reflected at the reflecting mirror 5, and forms an image at the screen 2.

Figure 3:
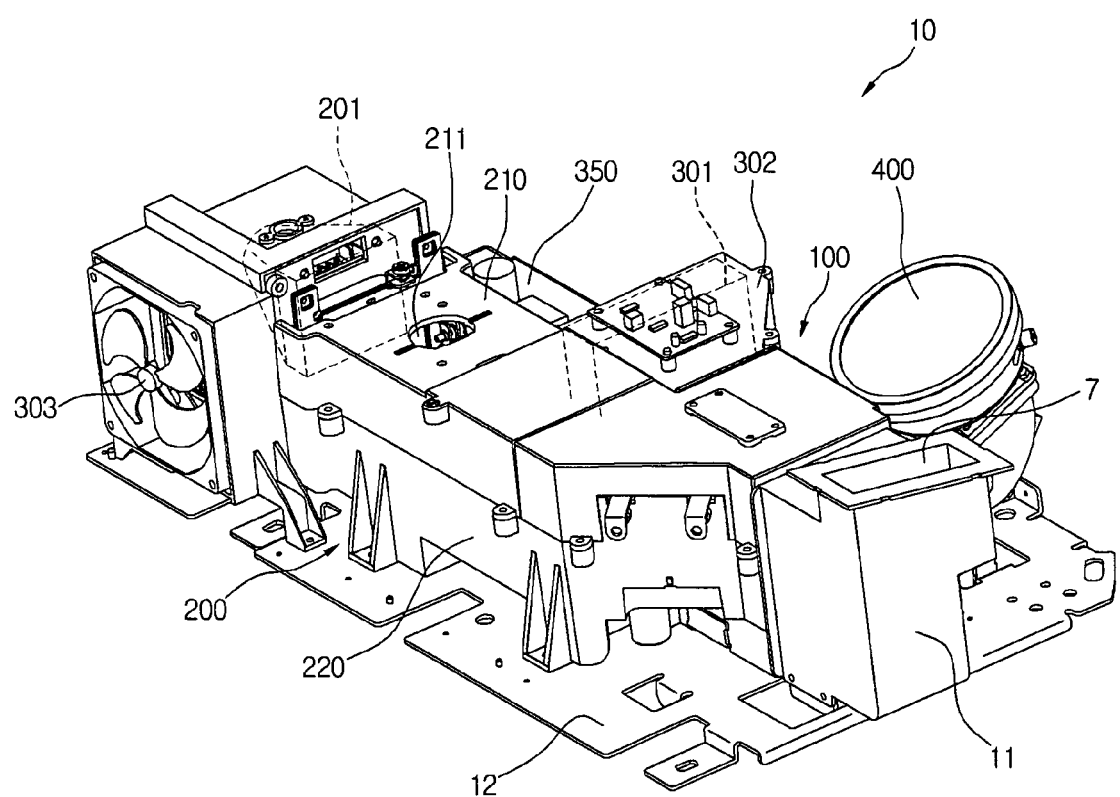
FIG. 3 is a perspective view of an optical engine in the projection system according to the present invention.
Figure 4:
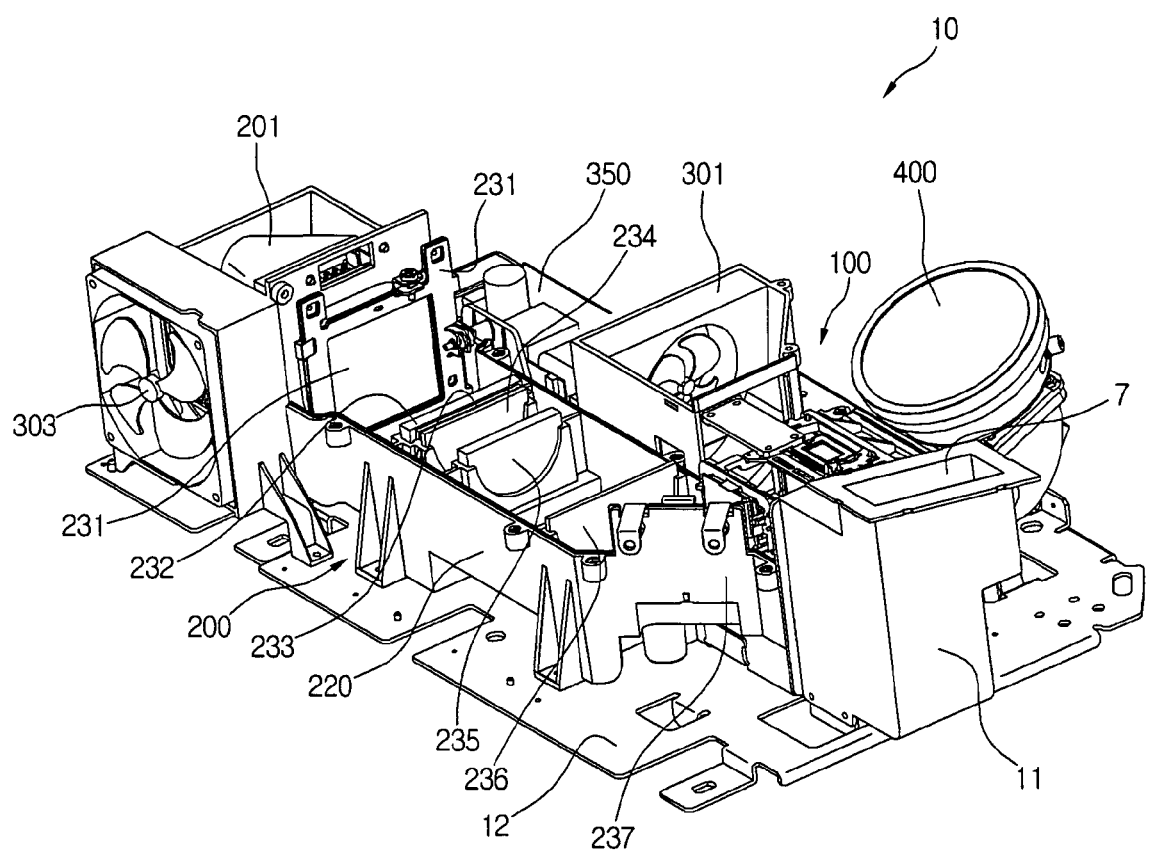
FIG. 4 is a perspective view of the optical engine whose a cover is removed.

FIG. 3 is a perspective view of an optical engine in the projection system according to the present invention and FIG. 4 is a perspective view of the optical engine whose a cover is removed. Referring to FIGS. 3 and 4, a construction and a function of the optical engine will be described in detail.

The optical engine 10 includes an engine base 12 forming a lower surface of the optical engine 10 and a lot of parts placed on an upper surface of the engine base 12. A lot of parts include an illumination unit 200 for irradiating and refracting light, a composition unit 100 composing an image of RGB three color light including an image signal by light emitted from the illumination unit 200, and a projecting lens 400 for projecting light composed at the composition unit 100.

Further, although not directly related to image forming, a lot of parts further include a power supplier 350 for stably supplying power and fans 301 and 303 for cooling heat generated at the optical engine 10. At least an electronic stabilizer is provided in the power supplier 350 to supply stable power to a lamp 201 and the fans 301 and 303 flow air for properly cooling the optical engine 10.

Now, the aforementioned structural elements will be described in detail.

First, the illumination unit 200 includes the lamp 201 for operating as a light source, a first fly eye lens (FEL) 231 and a second FEL 232 for improving uniformity of illuminating light emitted from the lamp 201, a polarizing beam splitter (PBS) 233 disposed at the backside of the second FEL 232, a plurality of lens 234, 235, and 236 for exactly projecting light passed through each cell of the FELs 231 and 232 at a right position of the LCOS panel, and a folding mirror 237 for turning a traveling direction of a light source to the composition unit 100.

Specifically, the PBS 233 converts all light including P-polarized light in the illuminating light into S-polarized light, uses a plurality of half-wave plates, and the FELs 231 and 232 allows light to be incident at a right position of the PBS 233. The illuminating light includes S-polarized light that has X axis wavelength and P-polarized light that has Y axis wavelength which have a direction perpendicular to the light traveling direction and P-polarized light emitted from the lamp 201 is converted to S-polarized light by the PBS 233 and thus all light is incident to the composition unit 100 in S-polarized state. Therefore, there is an advantage in that a utilization efficiency of light is improved because the P-polarized light which may be removed in the composition unit is again used.

Specifically, the folding mirror 237 turns by 90° a traveling direction of the illuminating light to allow light to be incident to the composition unit 100 and it is preferable that a predetermined device for adjusting a tilt angle of a right-left/a top-bottom/a front-rear direction is provided to exactly adjust a light traveling direction.

Further, parts of the illumination unit 200 are provided to a housing 220 of the illumination unit which is fixed to the engine base 12, after parts are placed at the inside of the housing 220 of the illumination unit, a cover 210 is covered to protect the inside parts from external impact and prevent foreign substance from being injected into the inside of the illumination unit 200. A penetrating opening 211 is formed in a predetermined position of the cover 210 and discharges heat generating in parts constituting the illumination unit 200 and an inner space of the illumination unit 200 to the outside by natural convention so that inside space of the cover 210 does not reach at an overheated state. Although one penetrating opening 211 is formed in the figure, a plurality of penetrating openings may be formed as needed. Preferably, the penetrating opening 211 is formed at the upper side around the PBS 233 to discharge high heat generating at the PBS 233 to the outside by natural convention.

After S-polarized light is incident to the composition unit 100, it is separated by wavelengths and incident into RGB three color LCOS panel, and it is again composed at a state including an image signal after it is reflected in the LCOS panel and emitted through the projecting lens 400. A detailed construction of the composition unit 100 will be described later.

A cooling system for cooling the optical engine 10 will be described in detail.

Two fans 301 and 303 for forcedly flowing air and a plurality of guide structures for guiding air flow by the fans 301 and 303 are provided in the optical engine 10. According to the flow order of air, the cooling system of the optical engine will be described.

First, cold air injected into a space between the screen 2 and the back cover 4, that is, a light projecting space through the air injection port 7 is injected into the optical engine 10 side. The air injection port 7 I formed at a cold air injection guide 11 fixed to the side wall of the composition unit 100. The cold air injection guide 11 injects air into the side of the composition unit 100 by turning to the composition unit 100 side, that is, a side direction after injecting air to the upper side through the air injection port 7. Air injected into the composition unit 100 is injected into the first fan 301 after cooling inside heat of the composition unit 100. A suction guide 302 is provided to discharging smoothly air injected into the composition unit 100 in the neighboring outside of the first fan 301. Air ejected from the first fan 301 is ejected to the power supplier 350 to cool heat generated from the power supplier 350.

As can be seen from the aforementioned structure, as a cooling system by the first fan 301 transmits a negative pressure supplied from the first fan 301 to the composition unit 100 and the cold air injection guide 11, air of light projection space is injected through the opening portion 8 of the division plate side and the air injection port 7.

Further, in order to cool the lamp 201, the second fan 303 is provided in the side of the lamp 201. The second fan 303 discharges air (including air ejected from the first fan 301) around the power supplier 350 to the rear of the projection system 1 after injecting to the lamp 201 side, thereby discharging to the outside of the projection system.

As can be seen from the aforementioned structure, the first fan 301 and the second fan 303 are provided around a heat source to provide sucking force and thus cold air is discharged by the fans 301 and 303 after absorbing heat while it passes a heat source.

Figure 5:
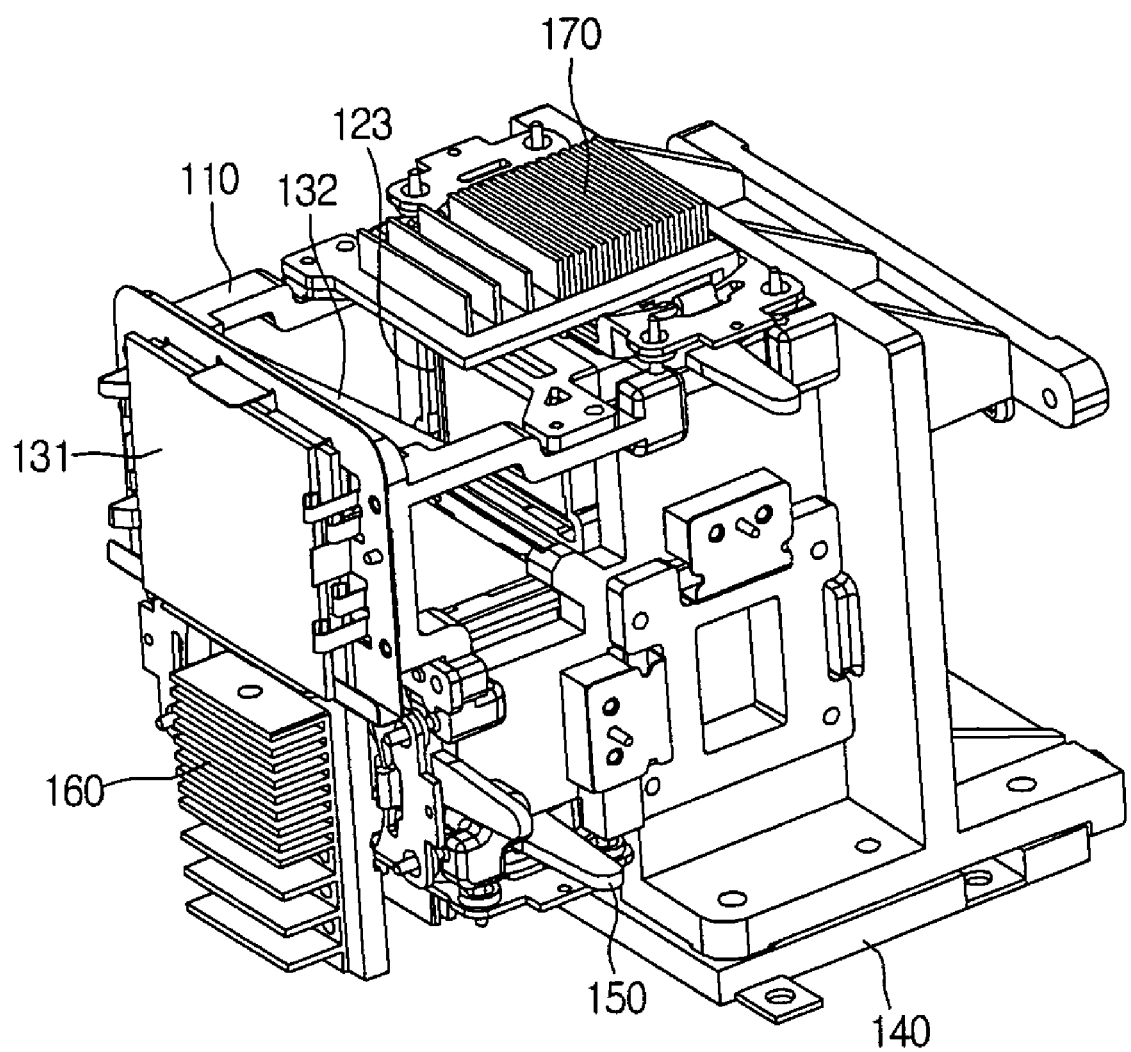
FIG. 5 is a perspective view of a composition unit in the projection system according to the present invention.
Figure 6:
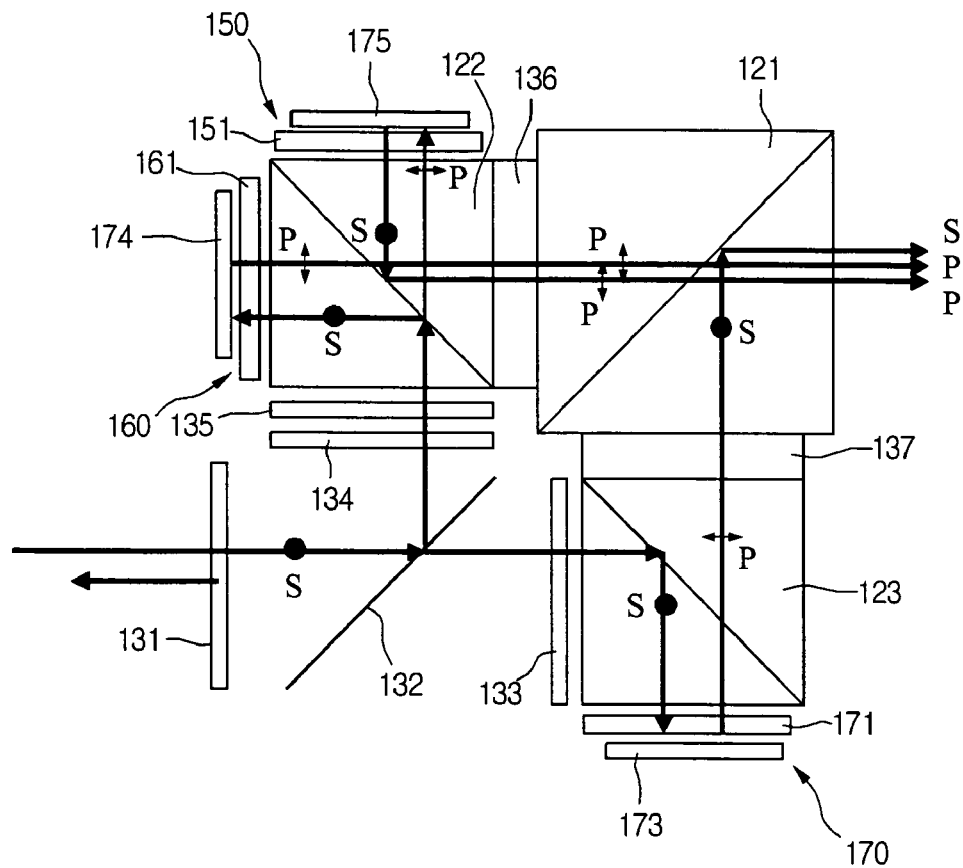
FIG. 6 is a view illustrating a structure and an operation of the composition unit.

FIG. 5 is a perspective view of the composition unit in the projection system according to the present invention and FIG. 6 is a view illustrating a structure and an operation of the composition unit. A structure and an operation of the composition unit 100 will be described in detail with reference to FIGS. 5 and 6.

Referring to FIG. 5, the composition unit 100 forms an image by separating S-polarized light into a plurality of parts and composing again, and it is provided with a plurality of quads and a LCOS panel assembly.

Specifically, the composition unit 100 includes three quads 121, 122, and 123, a quad housing 110 for supporting the quads, a single notch filter 131 for removing yellow light which is not required for S-polarized light, a dichroic mirror 132 for transmitting blue color light and reflecting green color light and red color light, and three LCOS panel assemblies 150, 160, and 170 as a liquid crystal panel which is fixed to the side of the quads 121, 122, and 123 to form the respective images of RGB three colors. The LCOS panel assemblies are provided to be adjacent to planes of the quads 121, 122, and 123 at a predetermined position of the quad housing 110 to allow light incident from the quad to be incident to an exact position of the LCOS panel.

A lot of filters, polarizing plate, etc., which are not shown in the FIG. 5, are further included in the composition unit 100. An operation of the composition unit will be described with reference to FIG. 6.

Referring to FIG. 6, after unnecessary yellow light is reflected and removed in the S-polarized light incident to the single notch filter 131, the remaining light is incident to the dichroic mirror 132, and among the light which is incident to the dichroic mirror 132, blue color light is transmitted and red color light and green color light are reflected. Now, a traveling process of light will be described in the order of blue color light, red color light, and green color light.

S-polarized blue color light which is transmitted the dichroic mirror 132 firstly passes through a second reflective polarizing plate 133 to increase the purity of S-polarized light. In other words, the purity of S-polarized light in illuminating light is improved because the second reflective polarizing plate 133 passes through only light having the same direction as optical axis of the S-polarized blue color light and filters light having a different direction of optical axis. Therefore, deterioration of an image due to incidence of undesired light is prevented.

Next, the light is reflected in the third quad 123 and incident to the third LCOS panel assembly 170. The quad as a beam splitter reflects S-polarized light and transmits P-polarized light.

Next, after the light is incident to a third quarter-wave plate 171 and linear polarized light is converted to circular polarized light, it is incident to a blue color LCOS panel 173, converted to P-polarized blue color light at a state including an blue color image and reflected. Although the P-polarized blue color light is again incident to the third quad 123, it is just transmitted to the third quad 123 because it is P-polarized blue color light.

Next, after the light is incident to a third birefringence polarizing plate 137, polarized by a half wavelength, and converted to S-polarized blue color light, it is incident to the first quad 121. The birefringence polarizing plate is to sort light generating polarized light and can perform the function with a structure which differently disposes a birefringence material depending on wavelength of light. The third birefringence polarizing plate 137 polarizes by a half wavelength with respect to blue color light.

Next, because S-polarized blue color light which is incident to the first quad 121 is S-polarized light, it is reflected in the first quad 121 and incident to the projecting lens 400.

Further, after S-polarized red color light which is reflected in the dichroic mirror 132 passes through the first reflective polarizing plate 134 and improves the purity of S-polarized light, it passes through the first birefringence polarizing plate 135 and is converted to P-polarized red color light. The first birefringence polarizing plate 135 polarizes red color light by a half wavelength using a birefringence material.

Next, the light is incident to the second quad 122 and because the incident light is P-polarized red color light, it is incident to the first LCOS panel assembly 150 after just transmitting the second quad 122.

Next, because the light is incident to a red color LCOS panel 175 after converting to circular polarized light by a first quarter-wave plate 151, it is converted to S-polarized red color light at a state including an red image and reflected, and reflected in the second quad 122 because it is S-polarized red color light.

Next, because the light is incident to the second birefringence polarizing plate 136, it is polarized by a half wavelength and converted to P-polarized red color light, and it is incident to the first quad 121 at the converted state. Because P-polarized red color light which is incident to the first quad 121 is P-polarized light, it is incident to the projecting lens 400 by transmitting the first quad 121.

Further, after S-polarized green color light which is reflected in the dichroic mirror 132 passes through the first reflective polarizing plate 134 and improves the purity of S-polarized light, it just transmits the first birefringence polarizing plate 135. Because the first birefringence polarizing plate 135 uses a birefringence material and polarizes only red color light by a half wavelength, it does not polarize green color light.

Next, because the light is incident to the second quad 122 and the incident light is S-polarized green color light, it is incident to the second LCOS panel assembly 160 after it is reflected in the second quad 122.

Next, because the light is incident to a green color LCOS panel 174 after converting to circular polarized light by a second quarter-wave plate 161, it is converted to P-polarized red color light at a state including an green image and reflected, and just transmits the second quad 122 because it is P-polarized red color light.

Next, the P-polarized red color light just transmits the second birefringence polarizing plate 136 and is incident to the first quad 121 without polarizing. The second birefringence polarizing plate 136 is converts only red color light and blue color light by a half wavelength and does not polarize green color light. Because P-polarized red color light which is incident to the first quad 121 is P-polarized light, it is incident to the projecting lens 400 by transmitting the first quad 121.

As described above, red color light and green color light are incident to the projecting lens at a P-polarized light state and blue color light is incident to the projecting lens 400 at an S-polarized light state. Then, after emitting from the projecting lens 400, three color light is reflected in the reflecting mirror 5 and displays an image to the screen 2. At this time, because a viewer watches an image at a state where it can not be sensed whether light of an image is S-polarized light or P-polarized light, there is no problem in watching an image.

After three color light including RGB three color images is composed, it is emitted through the projecting lens 400. If three color light is not matched at an exact position, an image is distorted or exact color is not embodied.

Specifically, because the quads 121, 122, and 123 are firmly fixed to a quad housing 110, it is difficult to separate the squads from the position. RGB three color assemblies should be exactly matched in the LCOS panel assembly and a matching process is very difficult because a process to fix the LCOS panel assembly to the quad housing 110 is difficult.

Further, the quarter-wave plate converts light which is incident into the LCOS panel from linear polarized light to circular polarized light to improve an entire contrast ratio of an optical unit and when an optical axis of polarized light is not matched, a contrast ratio is deteriorated and color is deteriorated.

Further, if the quarter-wave plate or the LCOS panel is contaminated by foreign substance injected into the quarter-wave plate, as described above, an image displayed to the screen 2 has different color. Problems related to contamination of the LCOS panel assembly are equally generated to each parts within the LCOS panel assembly placed in a traveling path of light as well as the quarter-wave plate.

The present invention provides the LCOS panel assembly for solving such problems.

Figure 7:
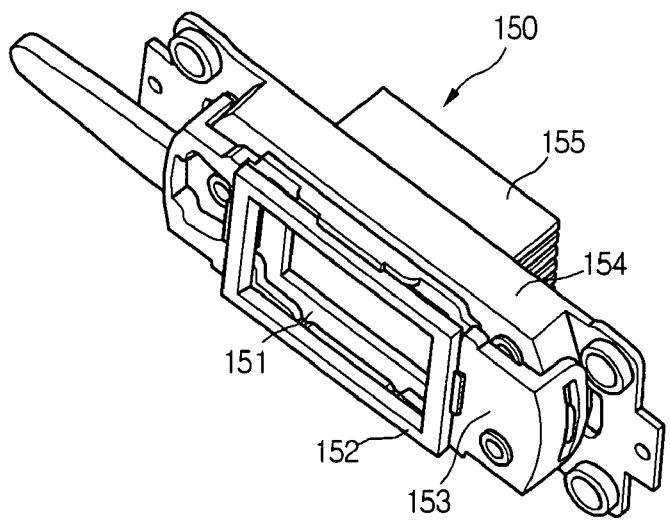
FIG. 7 is a perspective view of a LCOS panel assembly according to the present invention.
Figure 8:
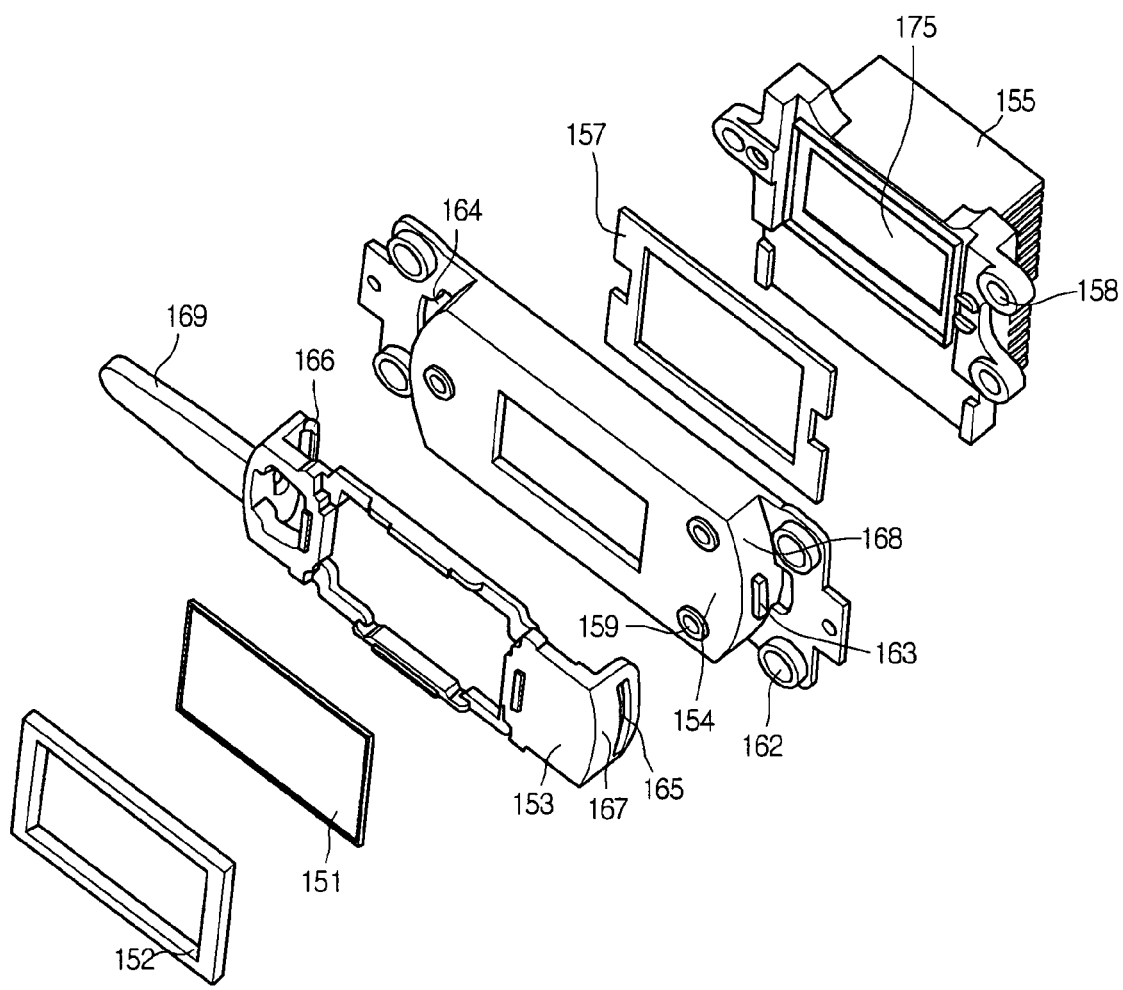
FIG. 8 is an exploded perspective view of a LCOS panel assembly according to the present invention.

FIG. 7 is a perspective view of the LCOS panel assembly according to the present invention and FIG. 8 is an exploded perspective view of the LCOS panel assembly according to the present invention. A first LCOS panel assembly is exemplified in the following description, but it is applicable to a second and third LCOS panel assemblies.

Referring to FIGS. 7 and 8, a LCOS panel assembly 150 includes a LCOS panel 175 having liquid crystal, a cooling pin 155 for cooling high heat generated during an operation of the LCOS panel 175, a quarter-wave plate 151 for converting light which is incident into the LCOS panel 175 to circular polarized light. The LCOS panel assembly 150 further includes a lot of parts for preventing foreign substance from being injected into the LCOS panel 175 and the quarter-wave plate 151.

Specifically, a lot of parts include the panel support 154 for supporting the LCOS panel, a second sealer 157 interposed on a contact surface of the panel support 154 and the LCOS panel 175, a quarter-wave plate holder 153 which is placed on the front side of the panel support 154 and provided for relative rotation about the panel support 154 at a state where the quarter-wave plate 151 is fixed thereto, and a first sealer 152 provided in the front side of the quarter-wave plate holder 153.

The first sealer 152 is interposed on a contact surface of the quarter-wave plate holder 153 and the quad 122 and prevents foreign substance from being injected through the contact surface. The second sealer 157 prevents foreign substance from being injected through the contact surface of the LCOS panel 175 and the panel support 154. The quarter-wave plate 151 is adhered to the quarter-wave plate holder 153 by adhesives such as silicone and prevents foreign substance from being injected through the contact surface of both parts.

Specifically, the first sealer 152 has a quadrangular-frame shape having a quadrangular opening for transmitting light at the inside thereof and is provided in a predetermined thickness. The first sealer 152 is provided in the frontmost of the LCOS panel assembly 150 due to itself thickness to prevent foreign substance from being injected through the contact portion by sealing of the contact portion when the LCOS panel assembly 150 is fastened to the quad 122 side. The first sealer 152 is made of rubber and prevents a gap from occurring in the contact portion due to soft elastic deformation when the LCOS panel assembly 150 is fastened to the quad.

Specifically, the quarter-wave plate holder 153 and the panel support 154 are adhered to prevent foreign substance from being injected through the contact portion of the quarter-wave plate holder 153 and the panel support 154. However, even if the quarter-wave plate holder 153 and the panel support 154 are adhered, it is required to adjust image matching of the quarter-wave plate 151 and the LCOS panel 175 after matching of the quarter-wave plate 151 and the LCOS panel 175. For this reason, epoxy adhesives having long curing time are used as adhesives interposed on the contact portion of the quarter-wave plate holder 153 and the panel support 154.

Specifically, "EW2020" manufactured by 3M Co., Ltd. is used as the adhesives, made of epoxy, and has heat resistance property of 200° C. or more and excellent chemistry resistance property and excellent corrosion resistance property, and a shrinkage ratio of less than 5%. Curing time of the adhesives takes two to four weeks at normal temperature. However, curing time is different depending on ambient air temperature and takes about 60 minutes at ambient air temperature of 120° C. Hereinafter, adhesives having long curing time are referred to as low-speed curing adhesives.

Specifically, the second sealer 157 is made of a sponge having a quadrangular-frame shape and interposed on the contact portion when the LCOS panel 175 is fastened to the panel support 154 to prevent foreign substance from being injected through the contact portion. Because the second sealer 157 is made of a sponge, it does not cause residual stress when deformed and not deteriorate image matching due to deformation or inject foreign substance due to a gap.

As another method, the second sealer 157 and adhesives may be interposed in a position where the second sealer 157 is placed and in this case, a gap between the LCOS panel 175 and the panel support 154 does not originally deformed by residual stress and the adhered portion does not separated. In other words, when the LCOS panel 175 and the panel support 154 are coupled by a predetermined fastening tool, if adhesives are interposed on both contact portions of the second sealer 157, the adhesives are cured after a fixed time passes. Because the LCOS panel 175 and the panel support 154 are firmly coupled by cured adhesives, both parts can not be deformed at their relative positions and thus nonmatching of an image can not be generated. Further, because the contact portion of the LCOS panel 175 and the panel support 154 can be perfectly sealed with the second sealer 157 by cured adhesives, foreign substance can not be injected.

As another method, when applying only adhesives without interposing the second sealer 157 to the contract portion of the LCOS panel 175 and the panel support 154, the LCOS panel 175 and the panel support 154 may be fastened. In this case, because the contact portion of both parts can be perfectly sealed and residual stress is not generated, the shape is not deformed later.

A coupling relation of parts constituting the LCOS panel assembly 150 will be described.

A LCOS panel coupler 158 is formed at a circumferential edge of the LCOS panel 175 and a fixing hole 159 of the panel side is formed at a position corresponding to the LCOS panel coupler 158 at the panel support 154. When both parts are aligned by this structure, a screw, etc. is inserted into the LCOS panel coupler 158 and the panel fixing hole 159, so that both parts can be firmly coupled.

Further, a plurality of fixing holes 162 of the quad side are formed at a circumferential edge of the panel support 154. When the fixing hole 162 of the quad side is aligned with any part fixed to the quad housing 110 or the quad 122, by inserting a fastening tool into the fixing hole 162 of the quad side, the panel support 154 can be fixed to the quad 122. In order to exactly perform matching between three LCOS panel assemblies 150, 160, and 170, a variable position structure as a connection structure is further intervened to a connection portion of the quad 122 and the LCOS panel assembly 150. A position of the LCOS panel assembly 150 to the quad 122 can be adjusted by the variable position structure and if positions of the respective LCOS panel assemblies 150, 160, and 170 are again adjusted, matching between the LCOS panels can be exactly performed.

On the other hand, by allowing the quarter-wave plate holder 153 to relatively rotate to the panel support 154, a rotation structure to satisfy a requirement for adjusting matching of the quarter-wave plate 151 and the LCOS panel 175 is further provided.

First, a guide protrusion 163 is formed in one side of the panel support 154 and a protrusion insertion hole 165 is formed in a position of the quarter-wave plate holder 153 corresponding to the guide protrusion 163. A guide hole 164 is formed in the other side of the panel support 154 and an adjusting guide 166 is formed in a position of the quarter-wave plate holder 153 corresponding to the guide hole 164. A handle 169 is extended from one side of the quarter-wave plate holder 153 where the adjusting guide 166 is formed and thus a worker can rotate the quarter-wave plate holder 153 with the handle. A fitting surface 168 of the support side which is bent in a curved shape is formed at one side of the panel support 154 where the guide protrusion 163 is formed and the fitting surface 167 of the holder side which is bent in a curved shape is formed in a position of the quarter-wave plate holder 153 corresponding to the fitting surface 168 of the support side.

Further, the lower end of the adjusting guide 166 is bent so that when a body of the adjusting guide 166 is inserted into the guide hall 164, one end thereof is retained on back surface of the panel support 154, whereby the quarter-wave plate holder 153 is not separated from the panel support 154.

An adjusting operation of the quarter-wave plate holder 153 having the above structure will be described.

If pushing the quarter-wave plate holder 153 toward the panel support 154 side from the front to the rear, the adjusting guide 166 is inserted into a guide hole 164 and a bent lower portion of the adjusting guide 166 is retained to the back surface of the panel support 154, and the guide protrusion 163 is inserted into and retained at the projection insertion hole 165.

Accordingly, both ends of the quarter-wave plate holder 153 can be firmly supported to the panel support 154. At this time, because the fitting surface 167 of the holder side is contacted with the fitting surface 168 of the support side at a state where both surfaces are softly curved, if a user rotates the quarter-wave plate holder 153 with the handle 169, the quarter-wave plate holder 153 softly rotates with guided to the fitting surface 168 of the support side.

On the other hand, it is preferable to perform an adjusting operation of the quarter-wave plate holder 153 after image matching of red color light, green color light, and blue color light is performed by image matching between the LCOS panel assemblies 150, 160, and 170. For this reason, low-speed curing adhesives are used on the contact surface of the quarter-wave plate holder 153 and the panel support 154.

Therefore, even after three color LCOS panel assembly 150, 160, and 170 are fixed to a right position to the quads 121, 122, and 123 and entire image matching is performed, it is possible to adjust image matching between the quarter-wave plate 151 and the LCOS panel 175 by operating the quarter-wave plate holder 153.

Now, the image matching method of the projection system will be described in detail. First, when the LCOS panel assembly 150 is manufactured in a finished product, adhesives are interposed in the contact portion of the quarter-wave plate holder 153 and the panel support 154. Then, as the LCOS panel assemblies 150, 160, and 170 are coupled to the quad, the composition unit 100 is manufactured. After the composition unit 100 is coupled to the optical engine, image matching is performed between the LCOS panel assemblies 150, 160, and 170, that is, red color, green color, and blue color images.

Even after an assembling process of the composition unit and an image matching process between the LCOS panel assemblies 150, 160, and 170 are performed, the low-speed curing adhesives are not cured. Accordingly, it is possible to adjust image matching between the quarter-wave plate 151 and the LCOS panel 175 while rotating the quarter-wave plate holder 153. Of course, as time passes, a matching position of the quarter-wave plate 151 to the LCOS panel 175 is fixed by curing of adhesives interposed on the contact portion of the quarter-wave plate holder 153 and the panel support 154 and the contact portion of the quarter-wave plate holder 153 and the panel support 154 are perfectly sealed by adhesives, so that foreign substance is not injected through the contact portion of both parts and deterioration of an image is not generated although the projection system is used for long time.

According to the present invention, because foreign substance is reliably prevented from being injected into the inside of the LCOS panel assembly, a high definition image can be embodied for long time.

Further, after a lot of parts constituting the LCOS panel unit assembly are coupled to each other, deformation by residual stress between coupled portions is prevented, so that deterioration of an image is prevented although the projection system is used for long time.

Further, matching of the LCOS panel and the quarter-wave plate can be easily performed and foreign substance is originally prevented from being injected into the inside of the LCOS panel and the quarter-wave plate, so that image quality further improves.

Further, even after matching adjustment between three LCOS panels, matching adjustment of the LCOS panel and the quarter-wave plate can be performed at a manufacturing process of the projection system, so that the convenience of a manufacturing process is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A LCOS panel assembly of a projection system comprising:
    a LCOS panel;
    a panel support supporting the LCOS panel and coupled to a quad side;
    a quarter-wave plate provided at a front side of the LCOS panel to polarize light;
    a quarter-wave plate holder rotatably supported about the panel support at a state where the quarter-wave plate is coupled thereto; and
    adhesives interposed on a contact surface of the quarter-wave plate holder and the panel support, wherein a protrusion inserting hole formed in one side of the quarter-wave plate holder and a guide protrusion formed in the panel support are connected to each other to guide a rotation of the quarter-wave plate.

2. The LCOS panel assembly of claim 1, wherein after the adhesives are interposed, the quarter-wave plate holder is rotated about the panel support to adjust image matching.

3. The LCOS panel assembly of claim 1, wherein the quarter-wave plate holder is extended long and a handle is formed in at least one end of the holder.

4. The LCOS panel assembly of claim 3, wherein the panel support and the quarter-wave plate holder are provided to correspond in a curved shape in an opposite side of the handle.

5. The LCOS panel assembly of claim 1, wherein a adjusting guide which extended from one side of the quarter-wave plate holder and whose an end is retained to a back surface of the panel support to prevent the quarter-wave plate holder from coming out.

6. The LCOS panel assembly of claim 1, further comprising a second sealer and/or adhesives interposed on a contact portion of the LCOS panel and the panel support.

7. The LCOS panel assembly of claim 6, wherein the second sealer is a sponge.

8. The LCOS panel assembly of claim 1, further comprising a first sealer provided on a front surface of the quarter-wave plate holder.

9. The LCOS panel assembly of claim 8, wherein the first sealer is coupled to the quarter-wave plate holder to prevent foreign substance from being injected.

10. The LCOS panel assembly of claim 8, wherein the first sealer is disposed in a circumferential edge of the quarter-wave plate.

11. A LCOS panel assembly of a projection system comprising:
    a LCOS panel;
    a panel support supporting the LCOS panel and coupled to a quad side;
    a quarter-wave plate provided at a front side of the LCOS panel to polarize light;
    a quarter-wave plate holder rotatably coupled to the panel support at a state where the quarter-wave plate is coupled thereto; and
    a sealer interposed on a contact portion of the LCOS panel and the panel support, wherein a protrusion inserting hole formed in one side of the quarter-wave plate holder and a guide protrusion formed in the panel support are connected to each other to guide a rotation of the quarter-wave plate.

12. The LCOS panel assembly of claim 11, wherein the LCOS panel is fixed to the panel support by a screw.

13. The LCOS panel assembly of claim 11, wherein the sealer is a sponge.

14. The LCOS panel assembly of claim 11, wherein at least one surface of the sealer is coated with adhesives.

15. A LCOS panel assembly of a projection system comprising:
- a LCOS panel;
- a panel support supporting the LCOS panel at a front side and coupled to a quad side;
- a quarter-wave plate holder rotatable provided at the front side of the panel support to support a quarter-wave plate and at a state where the quarter-wave plate is coupled thereto; and
- a sealer provided at the front side of the quarter-wave plate holder to seal a contact portion of the quarter-wave plate holder and the quad side, wherein a protrusion inserting hole formed in one side of the quarter-wave plate holder and a guide protrusion formed in the panel support are connected to each other to guide a rotation of the quarter-wave plate.

16. The LCOS panel assembly of claim 15, wherein the sealer is made of rubber.

17. The LCOS panel assembly of claim 15, wherein the sealer is adhered to the quarter-wave plate holder.

18. The LCOS panel assembly of claim 17, wherein the adhesives are made of silicon.

19. An image matching method of a LCOS panel assembly of a projection system, the method comprising:
- manufacturing a single LCOS panel assembly which rotatably supports a quarter-wave plate holder supporting a quarter-wave plate about a panel support supporting the LCOS panel;
- performing image matching between a plurality of LCOS panel assemblies; and
- curing adhesives to adhere and fix the quartet-wave plate holder and the LCOS panel assembly after image matching is performed between the quarter-wave plate and the LCOS panel, wherein the adhesives are injected before image matching is performed.

* * * * *